(12) United States Patent
Cho

(10) Patent No.: US 7,324,531 B2
(45) Date of Patent: Jan. 29, 2008

(54) GATEWAY ENABLING DATA COMMUNICATION BETWEEN DEVICES HAVING DIFFERENT MIDDLEWARES

(75) Inventor: Song-yean Cho, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 1032 days.

(21) Appl. No.: 10/186,261

(22) Filed: Jul. 1, 2002

(65) Prior Publication Data

US 2003/0016682 A1    Jan. 23, 2003

(30) Foreign Application Priority Data

Jul. 5, 2001    (KR)    ............... 2001-40050

(51) Int. Cl.
*H04L 12/28* (2006.01)
*H04L 12/43* (2006.01)
*H04J 3/16* (2006.01)
*G01R 31/08* (2006.01)

(52) U.S. Cl. .......... 370/401; 370/466; 370/461; 370/241

(58) Field of Classification Search .......... 370/464, 370/465, 466, 467, 401, 400, 469, 352, 392, 370/396; 709/250, 238, 249, 246
See application file for complete search history.

(56) References Cited

U.S. PATENT DOCUMENTS 6,310,889 B1 * 10/2001 Parsons et al. ............. 370/466
6,351,771 B1 * 2/2002 Craddock et al. ........... 709/227
6,546,419 B1 * 4/2003 Humpleman et al. ........ 709/223
6,697,620 B1 * 2/2004 Lamb et al. .............. 455/432.1
6,963,925 B1 * 11/2005 Ishikawa et al. ............ 709/238
7,035,270 B2 * 4/2006 Moore et al. ............... 370/401
7,111,077 B1 * 9/2006 Starkovich et al. ......... 709/246

FOREIGN PATENT DOCUMENTS

| JP | 10-173696 A | 6/1998 |
| JP | 2001-7861 A | 1/2001 |
| WO | WO 00/76131 A1 | 12/2000 |
| WO | WO 01/01632 A2 | 1/2001 |
| WO | WO 01/05186 A1 | 1/2001 |

* cited by examiner

Primary Examiner—Hanh Nguyen
(74) Attorney, Agent, or Firm—Sughrue Mion, Pllc.

(57) ABSTRACT

A gateway, which enables data communication between devices having different middlewares in a home network, a home network system, and a data relay method are provided. The gateway includes a generic middleware agent for including various middleware used by devices in the network and formatting a message using one of the middlewares corresponding to the middlewares of the message destination device, and a network access unit for receiving the formatted message from the generic middleware agent and sending the message to the destination device through the network. When devices using different middlewares in the home network system exchange messages, the gateway enables them to communicate effectively, eliminating the need for installation of different middlewares in each of the devices.

16 Claims, 5 Drawing Sheets

GATEWAY ENABLING DATA COMMUNICATION BETWEEN DEVICES HAVING DIFFERENT MIDDLEWARES

BACKGROUND OF THE INVENTION

1. Field of the Invention

The present invention relates to data communication between devices in a home network, and more particularly, to a gateway that enables data communication between devices having different middlewares in a home network, to a home network system, and to a data relay method

2. Description of the Related Art

In a home network such as IEEE 1394, there are various devices that have different features and middleware suitable for the different features. The middleware includes Home Audio Video Interoperability (HAVI) for audio/video devices, Universal Plug and Play (UPNP), and Jini.

FIG. 1 shows an example of the configuration of devices in a home network. As shown in FIG. 1, the home network is configured with a first device 100, a second device 110, and a third device 120.

The first device 100 includes a function module 101 for performing a unique function of the first device, a middleware module 102 (HAVI) for interpreting the data of the function module 101 in a data format that can be communicated in the home network such as IEEE 1394 or converting a command transmitted by the home network into a data format used by the function module 101, and an IEEE 1394 module 103 for receiving data from or transmitting data to the IEEE 1394 home network.

The second device 110 includes two function modules 111 and 112, two middleware modules 113 (HAVI) and 114 (UPNP), and an IEEE 1394 module 115 for being implemented as a home network and a TCP/IP module 116 for accessing other networks including the Internet.

The HAVI 113 is a middleware that connects the IEEE 1394 module 115 and the function module 111 of the second device 110. The UPNP 114 is a middleware that connects the function module 112 of the second device 110 and the TCP/IP module 116.

The third device 120 includes a function module 121, a UPNP module 122, and a TCP/IP module 123.

Since the first device 100 and the third device 120 use different middlewares, as shown in FIG. 1, they cannot interpret control messages exchanged between them. For example, if the third device 120 intends to interpret the message transmitted by the first device 100, it should have the HAVI necessary to interpret the message. This is true of the case when the third device 120 transmits a message to the first device 100. That is, because the first device 100 does not have the UPNP, it cannot interpret the message transmitted by the third device 120 Therefore, for message exchange between these devices, the home network should include devices such as the second device which has both the middleware of the first device and the middleware of the third device.

FIG. 2 shows an example of operations of the devices shown in FIG. 1

When the second device 110 intends to use the function of the first device 100, the function module 111 of the second device 110 asks the HAVI module 113 if the first device 100 is available (①) The HAVI module 113 retrieves the first device 100 among the information about nodes, which is saved during a IEEE 1394 bus reset, and returns the ID of the retrieved first device 100 to the function module 111 of the second device 110 (②) Upon receipt of the ID, the function module 111 of the second device 110 sends a message, which requests the first device 100 perform an operation, to the HAVI module 113 through the API of the message system defined in a HAVI specification (③). The HAVI module 113 sends the message to the HAVI module 102 of the first device 100 (④). The HAVI module 102 of the first device 100 interprets the request from the received message and sends the message to the function module 101 (⑤). The function module 101 performs the requested operation (⑥) After performing the requested operation, the first device 100 notifies the HAVI module 102 of the operation result (⑦). The HAVI module 102 sends the result message to the HAVI module 113 of the second device 110 (⑧). The HAVI module 113 of the second device 110 interprets the received result message and notifies the function module 111 of it (⑨). Through the above procedure, the second device 110 (or the user of the second device) sends a desired command to the first device 100 and then receives the command execution result from the first device 100.

The operations of FIG. 2 can be supported by a second device 110 that has different middlewares. The first device 100 and the third device 120 cannot exchange data between them because each of them interprets messages in different ways. Therefore, if data is to be exchanged between devices in the home network, each device should have the middleware of the other devices, as the second device 110 has. However, even if each device in the home network has the middleware of the other devices, connecting a new device with a new middleware to the home network necessitates upgrading all the existing devices and installating the new middleware.

SUMMARY OF THE INVENTION

To solve the above-described problems, it is a first object of the present invention to provide a gateway that enables message exchange between devices having different middlewares in a home network.

It is a second object of the present invention to provide a home network system that enables message exchange between devices having different middlewares.

It is a third object of the present invention to provide a relay method of the gateway that enables message exchange between devices having different middlewares in a home network.

To achieve one of the above objectives, a gateway that enables message relay between devices using different middlewares in a network includes a generic middleware agent for including various middlewares used by devices in the network and formatting a message using one of the middlewares corresponding to the middlewares of the message destination device, and a network access unit for receiving the formatted message from the generic middleware agent and sending the message to the destination device through the network It is preferable that the generic middleware agent includes a table in which the lists of the devices that use identical middleware, the lists being updated by periodically retrieved networks, are stored, and a template for packetizing the message to be transmitted in a middleware format of a message destination device.

It is also preferable that the gateway further includes an arbiter for sending a signal to each middleware of the generic middleware agent and checking if the list of the message destination device exists in order to find out the destination device of the message received from the device from the network.

It is also preferable that the generic middleware agent includes a Home Audio Video Interoperability (HAVI), which is a middleware for audio/video devices in the home network, and a Universal Plug and Play (UPNP), which is a middleware for the plug-and-play of information on the Internet.

It is also preferable that the network access unit has the HAVI mapped with the IEEE 1394 specification and the UPNP mapped with TCP/IP specification.

To achieve another of the above objectives, a home network system that enables data communication between devices using different middlewares in a home network includes a first device for using a first middleware, a second device for using a second middleware, and a gateway for including the first middleware and the second middleware, converting a message received from a message origination device into the middleware format used by a message destination device, and sending the message to the message destination device.

It is preferable that the first device includes a first function module for performing a unique function of the first device, a first middleware for interpreting and converting a message to be received from or transmitted to the first function module according to a reference specification, and a first network access unit for exchanging the message between the first middleware and the network.

It is also preferable that the second device includes a second function module for performing a unique function of the second device, a second middleware for interpreting and converting a message to be received from or transmitted to the second function module according to a reference specification, and a second network access unit for exchanging the message between the second middleware and the network.

It is also preferable that the gateway includes a generic middleware agent for including the first middleware and the second middleware in the network and formatting a message using one of the middlewares corresponding to the middlewares of the message destination device, and a network access unit for receiving the formatted message from the generic middleware agent and sending the message to the destination device through the network.

It is also preferable that if a new device is connected to the home network, the middleware used by the new device can be further installed in the gateway.

To achieve another of the above objectives, a message relay method of a gateway that enables data communication between devices using different middlewares in a home network includes a first step where the first device generates a message to be transmitted to the second device, a second step where the gateway having the first middleware and the second middleware interprets the message according to the first middleware and converts the message into the second middleware format, and a third step where the converted message is transmitted to the second device.

It is preferable that the first step where the first device generates a message includes the steps of requesting the second device to perform a function, and sending the request to the first middleware of the gateway as the message satisfying the first middleware format.

It is also preferable that the second step where the gateway converts the message includes a step where the first middleware of the gateway checks if the second device is available as the message destination device in the network, a step where the message having the first middleware format is converted into the second middleware format if the second device is available in the network, and a step where the message having the second middleware format is sent to the second device.

It is also preferable that the message transmitted to the second device is processed in the following steps comprising a step where the message is interpreted by the second middleware and executed by the second device according to the request included in the message, and a step where the execution result of the second device is returned to the first device through the gateway.

It is also preferable that the step where the execution result is returned includes a step where the execution result message converted in the second middleware format is transmitted to the gateway and interpreted by the gateway in the second middleware format a step where the gateway checks if the first device is available in the network, and if the first device is available, the execution result message is converted into the first middleware format, and a step where the converted message is transmitted to the first device and interpreted by the first middleware

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

The present invention now will be described more fully with reference to the accompanying drawings.

Figure 1:
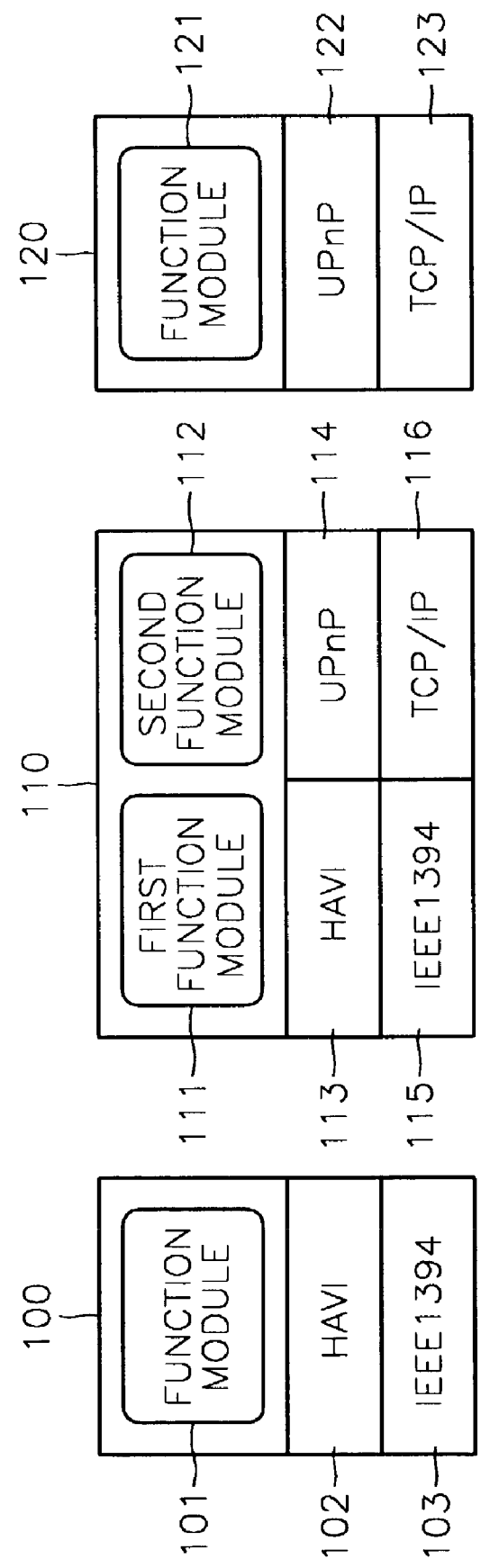
FIG. 1 shows configurations of devices in a home network.
Figure 2:
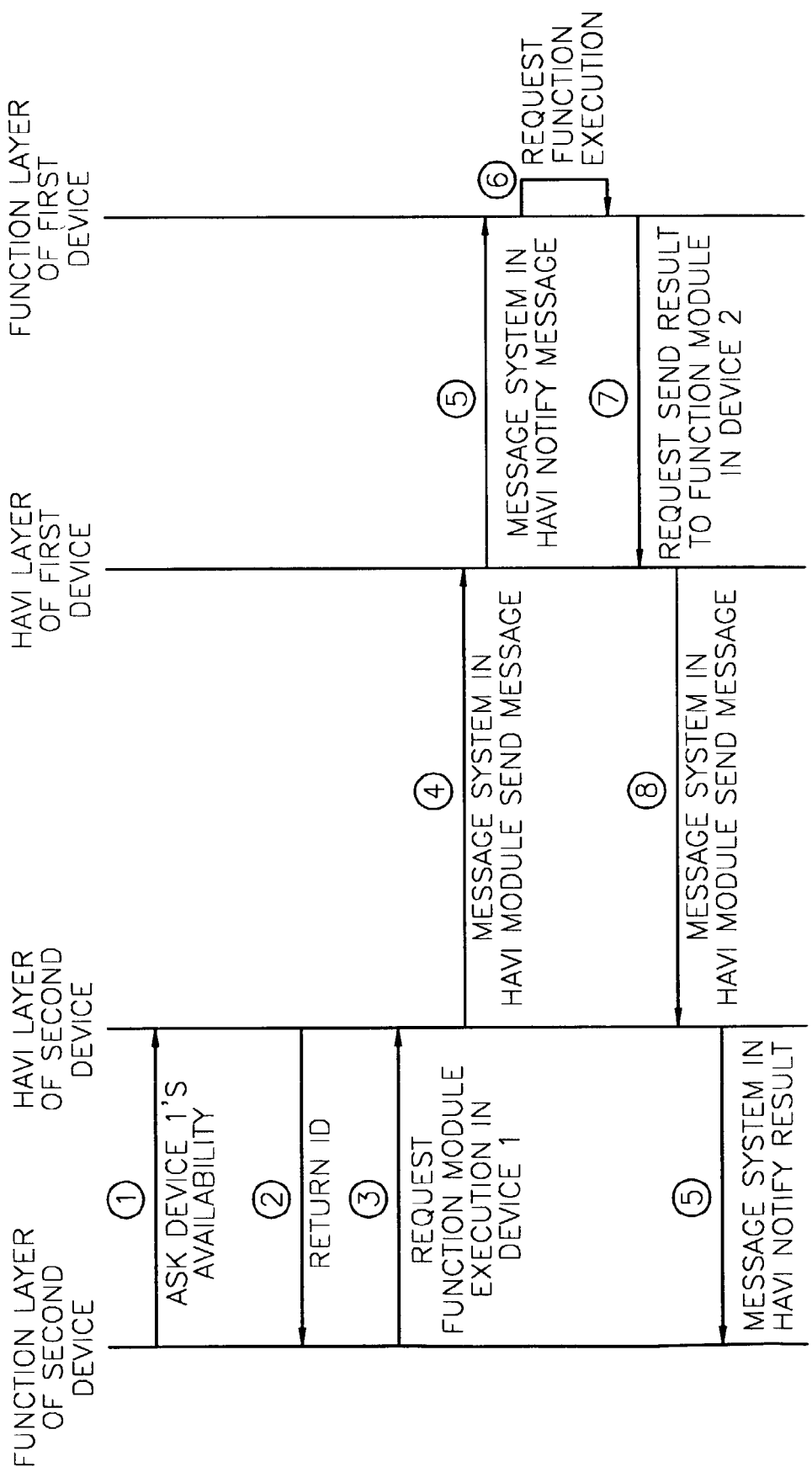
FIG. 2 shows the operations of the devices shown in FIG. 1.
Figure 3:
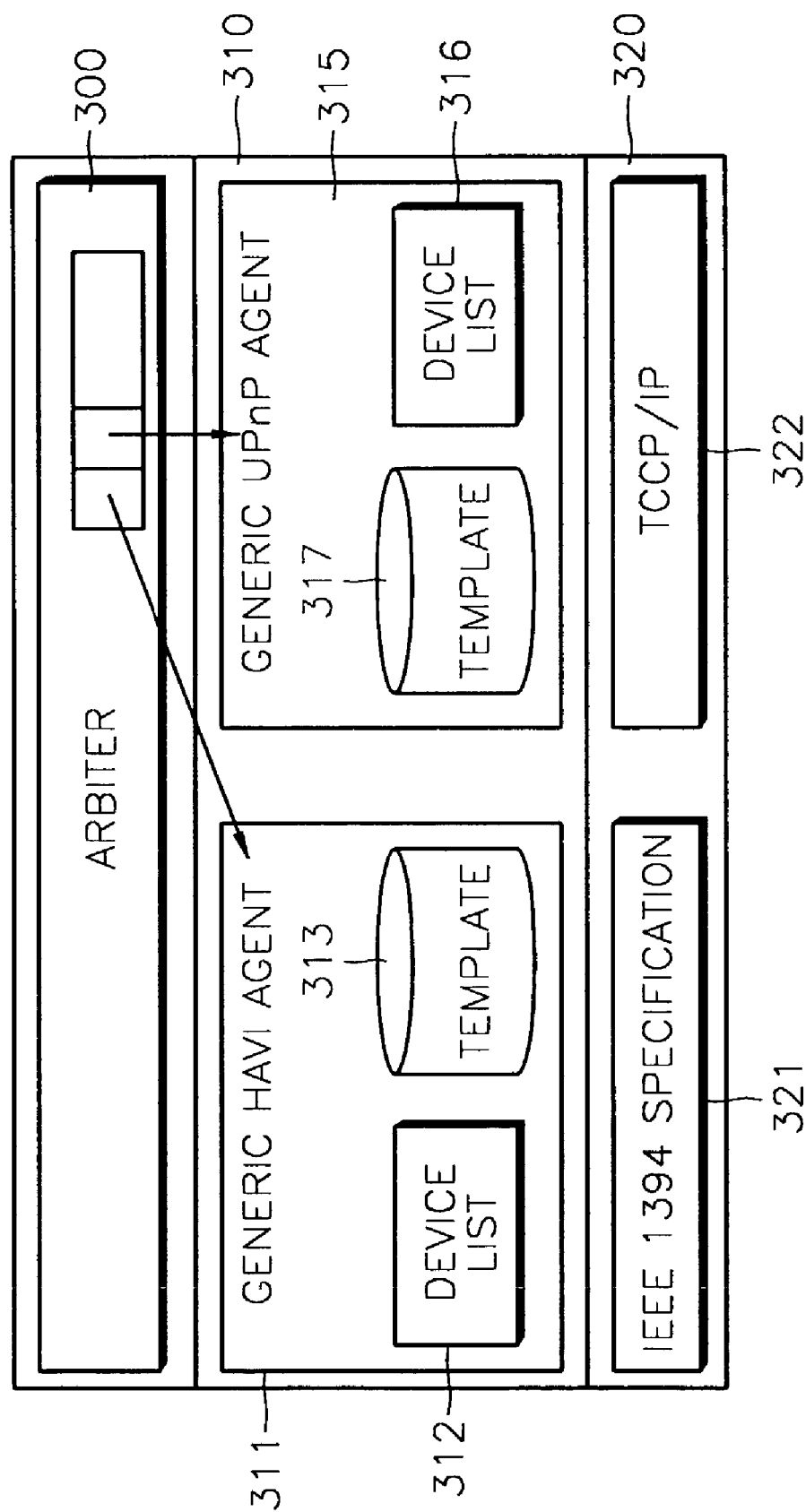
FIG. 3 shows an embodiment of the configuration of a gateway according to the present invention.

FIG. 3 shows the configuration of a gateway according to the present invention.

The gateway includes an arbiter 300, a generic middleware agent 310, and a network access unit 320. A message transmitted to the gateway includes information about the destination device that will receive the message, such as the device ID or the device node number.

The arbiter 300 receives the message transmitted to the gateway and sends the device information included in the message to each of the middleware in the generic middleware agent 310.

The generic middleware agent 310 includes different middlewares of the gateway and devices connected in a network. For the convenience of understanding, FIG. 3 describes only a first middleware 311 (Home Audio Video Interoperability: HAVI) and a second middleware 315 (Universal Plug and Play: UPNP). However, other various middlewares can also be included in the generic middleware agent 310. Hereinafter, the generic middleware agent 310 will be described with reference to the examples shown in FIG. 3. The HAVI 311 is a middleware for audio/video devices in the home network, and the UPNP 315 is a middleware for the plug-and-play of the information on the Internet. The HAVI 311 and the UPNP 315 include tables 312 and 316, and templates 313 and 317, respectively. The HAVI 311 and the UPNP 315 periodically retrieve the network, update the lists of devices that use identical middleware and store the lists of devices in the tables 312 and 316. The templates 313 and 317 packetize the message to be transmitted into a middleware format of a message destination device. The HAVI 311 receives node IDs or information about devices that use identical middleware from the network through a reset of the IEEE 1394 bus necessary for accessing the network and then saves the information in the table 312. The UPNP 315 periodically multicasts the search message in the format defined in the UPNP specification, receives information about the devices that have the UPNP middleware among the devices connected in the network, and then saves the information in the table 316. Upon receipt of the information about the destination device from the arbiter 300, the HAVI 311 and the UPNP 315 retrieve their own tables 312 and 316 and determine if the destination device is listed. If the HAVI 311 finds out the destination device in its table, it combines the function and the parameters of the supplementary information necessary for execution of the function, which are included in the message from the arbiter 300. The template 313 converts the original message into the message format defined in the HAVI specification. If the information about the destination device is found in the UPNP table 316, the template 317 converts the original message into the message format defined in the IJPNP specification.

The network access unit 320 receives the message formatted according to the HAVI specification or the UPNP specification from the generic middleware agent 310 and sends the message to the network. As shown in FIG. 3, the network access unit 320 includes an IEEE 1394 specification 321 mapped with the HAVI 311 and a TCP/IP specification 322 mapped with the UPNP 315.

The gateway of FIG. 3 can convert the message formatted in the first middleware specification into a message which has the format defined in the second middleware specification. Therefore, even if a message source device and a message destination device use different middlewares, a message can be transmitted and interpreted by the gateway.

Figure 4:
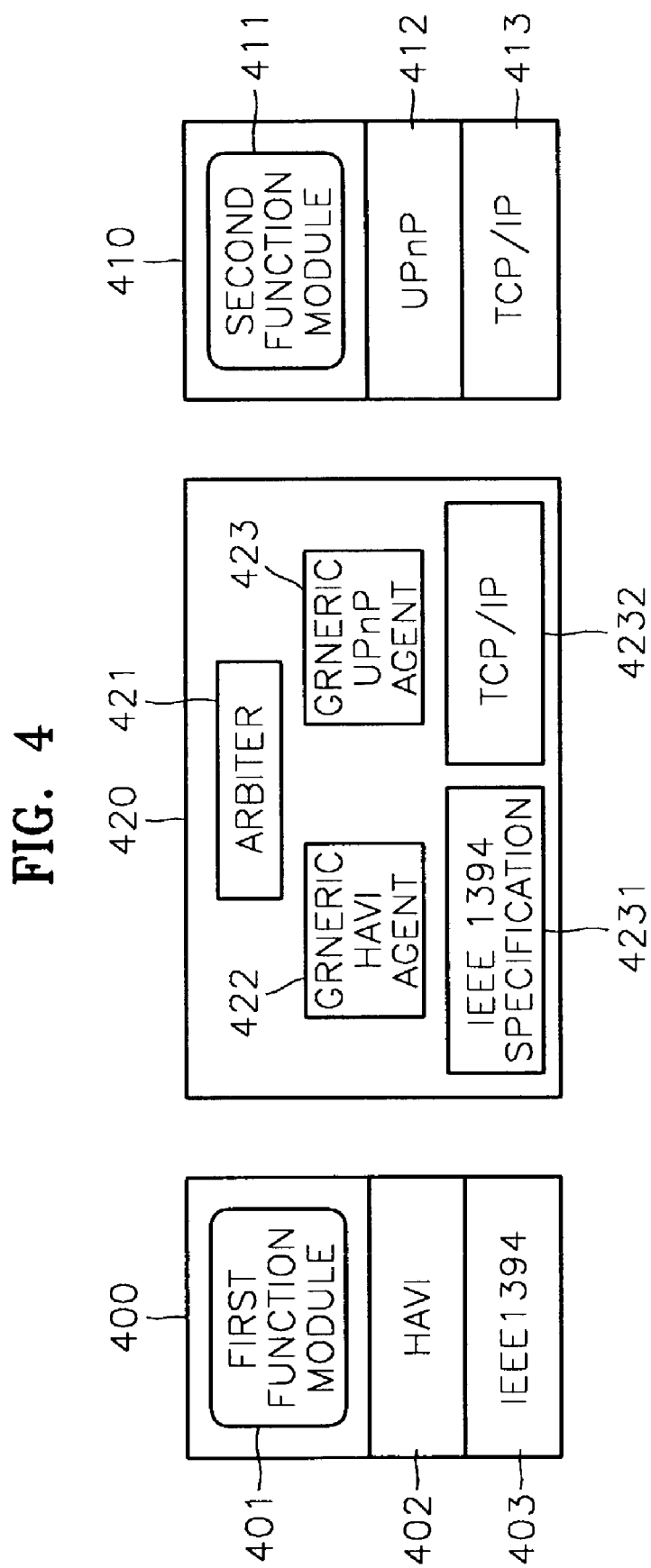
FIG. 4 shows an embodiment of a home network system according to the present invention.

FIG. 4 shows an embodiment of a home network system according to the present invention.

The home network system includes a first device 400, a second device 410, and a gateway 420. The first device 400 uses HAVI, which is the first middleware, and the second device 410 uses UPNP, which is the second middleware.

The first device 400 includes a first function module 401 for performing a unique function of the first device, a first middleware 402 (HAVI) for interpreting and converting a message to be received from or transmitted to the first function module 400 according to a reference specification, and an IEEE 1394 module 403, which is a first network access unit for exchanging the message between the first middleware 402 and the network.

The second device 410 includes a second function module 411 for performing a unique function of the second device, a second middleware 412 (UPNP) for interpreting and converting a message to be received from or transmitted to the second function module 411 according to a reference specification, and a TCP/IP module 413, which is a second network access unit for exchanging a message between the second middleware 412 and the network.

The gateway 420 includes middleware adopted by devices in the network and enables message relay between the devices For the convenience of understanding, FIG. 4 shows only two devices and two middleware. However, more devices and more middleware can be installed in the gateway 420. The gateway can be configured in the same way as the gateway shown in FIG. 3 when the devices 400 and 410 are considered. For more detailed explanation of the gateway, refer to the descriptions written with reference to FIG. 3.

The relaying of messages in the home network system of FIG. 4 will be described below.

Figure 5:
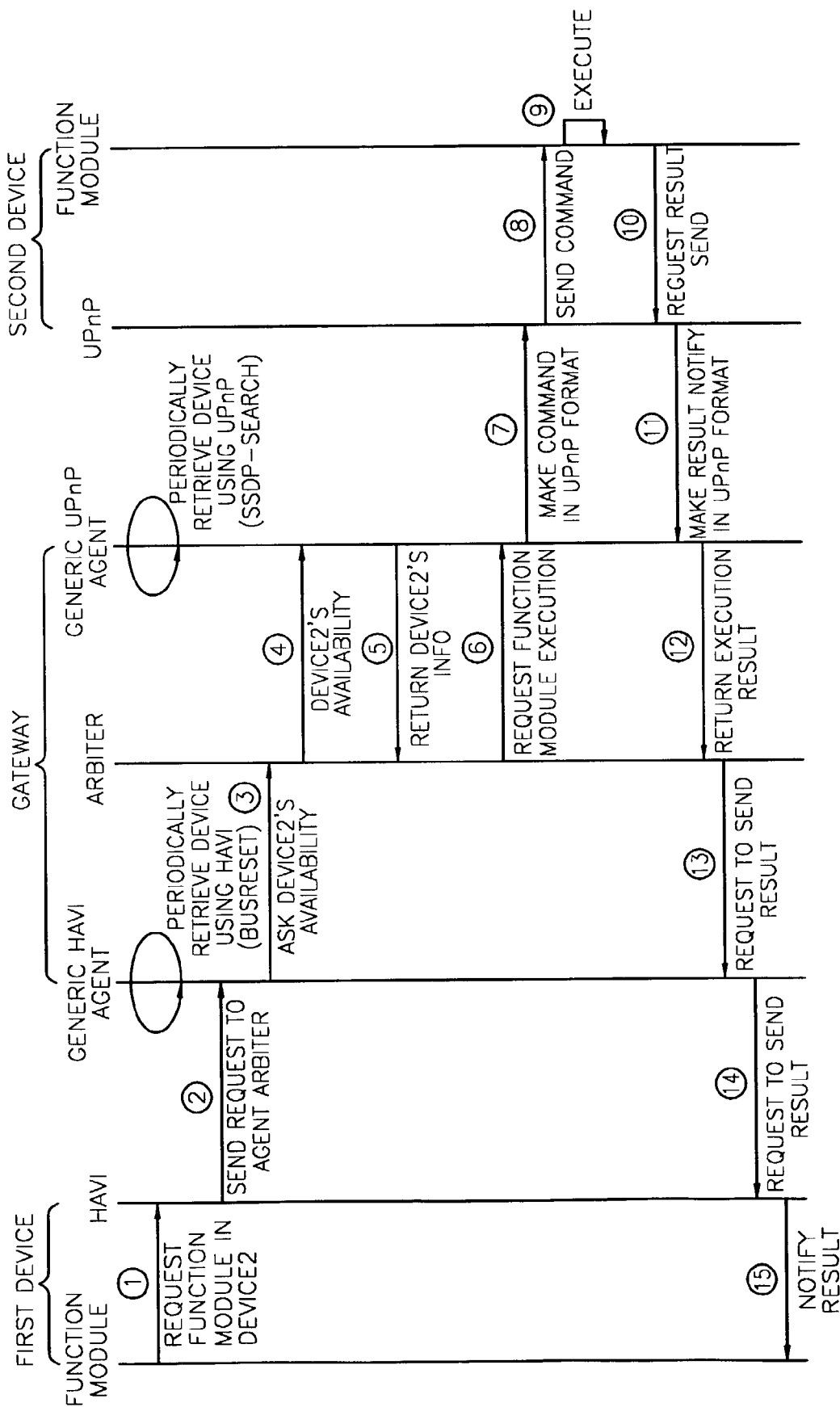
FIG. 5 is an embodiment of a flow diagram showing a message relay method of the home network system.

FIG. 5 is an embodiment of a flow diagram showing a message relay method of the home network system. The message relay operation can be classified into three steps. In the first step, the first device 400 generates a message to be transmitted to the second device 410 and sends the message to the gateway 420. In the second step, the gateway 420 interprets the message according to the first middleware 422 and converts the message into the format of the second middleware 423 and transmits the converted message. In the third step, the second device 410 executes the message and returns the execution result.

To be more specific, in the first step, the first function module 401 of the first device 400 generates a message that requests the second device 410 to perform a function or an operation and sends the message to the HAVI 402 (①). The HAVI 402 converts the message into the format defined in the HAVI specification and sends the message to the HAVI 422 of the gateway 420 (②).

In the second step, the HAVI 422 asks the arbiter 421 if the second device is available (③). The arbiter 421 asks the UPNP 423 if the second device 410 is available in the network since the received message format is the HAVI format (④). If the name of the second device exists in the table 4231, the UPNP 423 generates a response that the second device 410 is available and sends the response to the arbiter (⑤). If the second device 410 is available, the arbiter 421 sends the original message including a command for a function or operation, and parameters to the template 4232 of the UPNP 423 (⑥) The template 4232 of the UPNP 423 converts the message including the command for a function or operation, and the parameters into the format defined in the UPNP middleware specification and sends them to the second device 410 (⑦).

In the third step, the message transmitted to the second device 410 is interpreted by the UPNP 412, i.e., the second middleware, and sent to the second function module 411 (⑧). The second function module 411 executes the function requested for in the message (⑨). The execution result is returned to the UPNP 412 (⑩). The UPNP 412 converts the execution result into a format defined in the UPNP specification and sends it to the UPNP 423 of the generic middleware agents in the gateway 420 (⑪). The UPNP 423 of the gateway 420 sends the execution result to the arbiter 421 (⑫) and then to the HAVI 422 (⑬). The HAVI 422 converts the execution result into the format defined in the HAVI specification and sends it to the HAVI 402 of the first device 400 (⑭). The HAVI 402 sends the execution result to the first function module 401 (⑮)

Through the above procedures, a user of the first device can send the message that commands the second device using different middlewares to perform a function and receive the execution result from the second device.

According to the present invention, when devices using different middlewares in the home network system exchange messages, the gateway enables them to communicate effectively, eliminating the need for installation of different middlewares in each of the devices. In addition, if a device using a new middleware is connected to the network, installing the new middleware in only the gateway enables data communication between the new device and the existing devices.

What is claimed is:

1. A gateway that enables message relay between devices using different middlewares in a home network, the gateway comprising:
    a generic middleware agent for including the different middlewares used by source and destination devices in the home network and formatting a message using one of the different middlewares corresponding to one of middlewares of the message destination device;
    a network access unit for receiving the formatted message from the generic middleware agent and sending the message to the message destination device through the home network; and
    an arbiter for sending a signal to each middleware of the generic middleware agent and checking if the message destination device exists in a list of devices of the respective middleware in order to find in the list the message destination device for the message received from a device from the network.

2. The gateway of claim 1, wherein the generic middleware agent comprises:
    a table in which lists of the devices that use identical middleware, the lists being updated by periodically retrieved networks, are stored; and
    a template for packetizing the message to be transmitted in a middleware format of the message destination device.

3. The gateway of claim 1, wherein the generic middleware agent comprises:
    a Home Audio Video Interoperability (HAVI), which is a middleware for audio/video devices in the home network; and
    a Universal Plug and Play (UPNP), which is a middleware for the plug-and-play of information on the Internet.

4. The gateway of claim 3, wherein the network access unit has the HAVI mapped with an IEEE 1394 specification and the UPNP mapped with TCP/IP specification.

5. A home network system that enables data communication between devices using different middlewares in a home network, the home network system comprising:
    a first device of the home network for using a first middleware;
    a second device of the home network for using a second middleware;
    a gateway of the home network for including the first middleware and the second middleware, converting a message received from a message origination device of the home network into the middleware format used by a message destination device of the home network, and sending the message to the message destination device; and
    an arbiter for sending a signal to each middleware of the generic middleware agent and checking if the message destination device exists in a list of devices of a respective middleware in order to find in the list the message destination device for the message received from a device from the network,
    wherein the gateway comprises:
        a generic middleware agent for including the first middleware and the second middleware in the network and formatting the message using one of the middlewares corresponding to the middlewares of the message destination device, and
        a network access unit for receiving the formatted message from the generic middleware agent and sending the message to the destination device through the network.

6. The system of claim 5, wherein the first device comprises:
    a first function module for performing a unique function of the first device;
    a first middleware for interpreting and converting a message to be received from or transmitted to the first function module according to a reference specification; and
    a first network access unit for exchanging the message between the first middleware and the network.

7. The system of claim 5, wherein the second device comprises:
    a second function module for performing a unique function of the second device;
    a second middleware for interpreting and converting a message to be received from or transmitted to the second function module according to a reference specification; and
    a second network access unit for exchanging the message between the second middleware and the network.

8. The system of claim 5, wherein the generic middleware agent comprises:
    a table in which lists of devices that use identical middleware, the lists being updated by periodically retrieved networks, are stored; and
    a template for packetizing the message to be transmitted in a middleware format of the message destination device.

9. The system of claim 5, wherein the generic middleware agent comprises:
    a Home Audio Video Interoperability (HAVI), which is a middleware for audio/video devices in the home network; and
    a Universal Plug and Play (UPNP), which is a middleware for the plug-and-play of information of the Internet.

10. The system of claim 5, wherein the network access unit has a HAVI mapped with an IEEE 1394 specification and a UPNP mapped with a TCP/IP specification.

11. The system of claim 5, wherein if a new device is connected to the home network, the middleware used by the new device can be further installed in the gateway.

12. The home network system of claim 5, wherein the gateway is a single device positioned in the home network along with the first and second devices.

13. The home network system of claim 12, wherein the first and second devices are user devices in the home network and wherein the home network system enables data communication between the user devices.

14. A message relay method of a gateway that enables data communication between devices using different middlewares in a home network, the message relay method comprising:
    a first device of the home network generating a message to be transmitted to a second device of the home network;
    the gateway of the home network, having a first middleware and a second middleware, interpreting the message according to the first middleware and converts the message into a format of the second middleware; and
    transmitting the converted message to the second device of the home network, wherein the generation of a message by the first device comprises:
  requesting the second device to perform a function, and
  sending the request to the first middleware of the gateway as the message satisfying the format of the first middleware format,
wherein the conversion of the message by the gateway comprises:
  checking by the first middleware of the gateway if the second device is available as a message destination device in the home network,
  converting the message having the format of the first middleware into a format of the second middleware if the second device is available in the home network, and
  transmitting the message having the format of the second middleware to the second device.

15. The method of claim 14, wherein the message transmitted to the second device is processed in the following steps:

a step where the message is interpreted by the second middleware and executed by the second device according to the request included in the message; and a step where the execution result of the second device is returned to the first device through the gateway.

16. The method of claim 15, wherein the step where the execution result is returned comprises:

a step where an execution result message converted in the second middleware format is transmitted to the gateway and interpreted by the gateway in the format of the second middleware;

a step where the gateway checks if the first device is available in the network, and if the first device is available, the execution result message is converted into the format of the first middleware; and a step where the converted message is transmitted to the first device and interpreted by the first middleware.

* * * * *